July 22, 1969  D. G. RODDICK  3,456,493
METHOD AND APPARATUS FOR DETERMINING THE OCTANE RATING
OF FUEL USED IN INTERNAL COMBUSTION ENGINES
Filed Jan. 25, 1968  4 Sheets-Sheet 1

INVENTOR:
D. G. RODDICK
BY: A. H. McCarthy
HIS AGENT

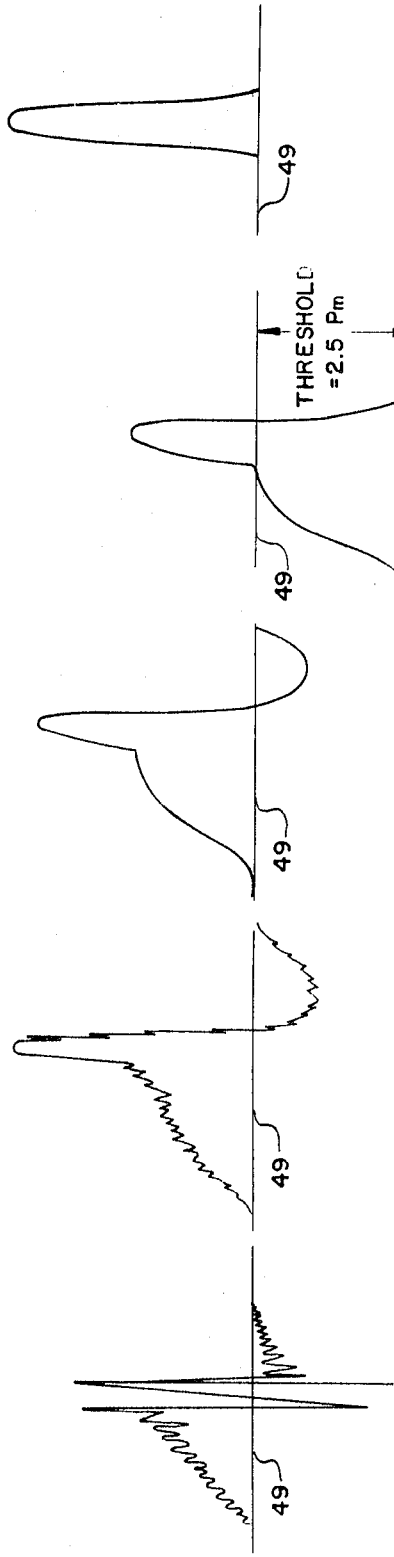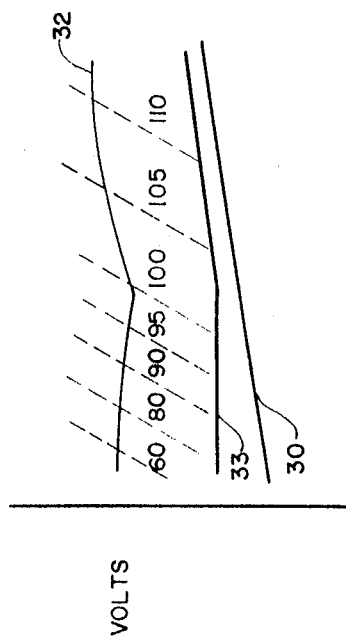

July 22, 1969     D. G. RODDICK     3,456,493
METHOD AND APPARATUS FOR DETERMINING THE OCTANE RATING
OF FUEL USED IN INTERNAL COMBUSTION ENGINES
Filed Jan. 25, 1968     4 Sheets-Sheet 4
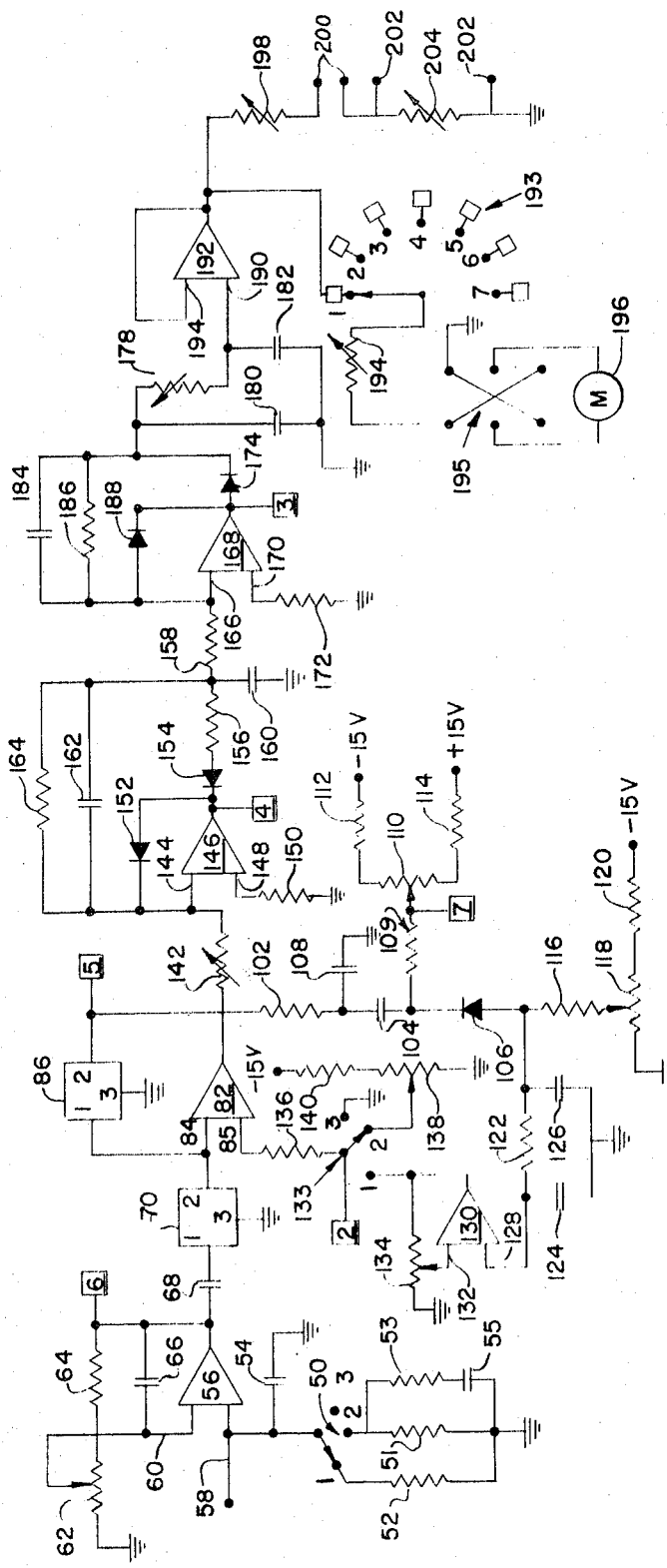
FIG. 8
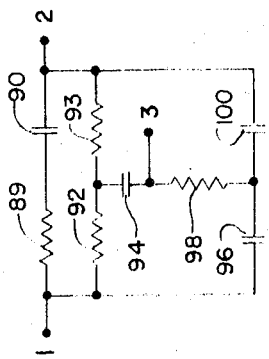
FIG. 8b
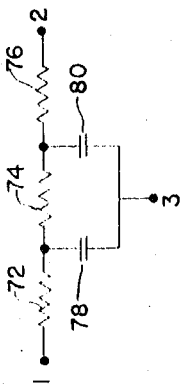
FIG. 8a
INVENTOR:
D. G. RODDICK
BY: 
HIS AGENT 3,456,493
Patented July 22, 1969

3,456,493
METHOD AND APPARATUS FOR DETERMINING THE OCTANE RATING OF FUEL USED IN INTERNAL COMBUSTION ENGINES
Douglas G. Roddick, Ferguson, Mo., assignor to Shell Oil Company, New York, N.Y., a corporation of Delaware
Filed Jan. 25, 1968, Ser. No. 700,552
Int. Cl. G01l 23/22
U.S. Cl. 73—35      5 Claims

ABSTRACT OF THE DISCLOSURE

An improved method and apparatus for electronically determining the octane ratings for fuels used in internal combustion engines. An automatically varying threshold device is used to separate a knocking signal component and a normal combustion signal component of a transduced electrical signal representing time-rate-of-change of pressure in a cylinder of an internal combustion engine.

BACKGROUND OF THE INVENTION

This invention relates to knock meters for determining the octane number of fuels for internal combustion engines and includes a method and apparatus for more accurately determining the intensity of engine knocking from which information octane numbers may be assigned.

By "knocking" is meant the explosive detonation of an air-fuel mixture in an internal combustion engine. The ability to determine the tendency of the fuel to knock under certain varying conditions is an important analytical tool for determining fuel quality since the presence of knocking in an internal combustion has several deleterious effects including reduced efficiency. Octane ratings are used to specify a fuel's tendency to knock.

Two laboratory procedures have been developed and are widely used to determine the octane ratings of motor fuels. They are the so-called Motor Method and Research Methods. For purposes of this invention, it is important only to note that a knock meter capable of meeting certain requirements is essential to both methods.

The knocking characteristics of a fuel may be determined by comparing its tendency to knock in an engine under certain standard conditions to the tendency of a reference fuel to knock under the same conditions. For convenience and to maintain as much reproducibility as possible, these tests are generally made in a one cylinder engine whose compression ratio may be continuously varied. Generally speaking, knocking is determined by monitoring the rate of pressure change within the cylinder with a pressure to electric signal transducer. Knocking is indicated by a short duration pulse or spike superimposed on a normal combustion signal.

By combustion is meant the steady even burning of a fuel-air mixture in the cylinder of an internal combustion engine after it has been ignited. Combustion does not include detonation which can be defined as an explosive reaction of fuel and air.

An early instrument used to measure knock intensity was mechanical. It was used for many years being replaced by an electrical analog version which is still in use. This instrument is described in U.S. Patent 2,633,738 to De Boisblanc. At the time of switching from the mechanical instrument, it was decided that continuity in octane ratings for fuel was important; and therefore, a requirement of all future instruments must be to indicate very nearly the same octane rating for a given fuel as the mechanical instrument.

The instrument presently in use, De Boisblanc's and over which the present invention is a substantial improvement, utilizes a magnetic tranducer, not susceptible to calibration, that is responsive to the rate of pressure change in a cylinder. Its output is filtered so that only frequencies below about 2000 Hz. are passed to the next stage of the meter. The next stange consists of two uncalibrated, cascaded, variable-gain amplifiers followed by a vacuum-tube-voltmeter that indicates average positive peak heights of the input signal. Between the two amplifiers, a fixed voltage is substracted so that only that portion of the signal in excess of the fixed voltage is passed to the second amplifier. This instrument is said to have a fixed voltage threshold.

To determine the octane rating of a fuel with De Boisblanc's instrument, the engine is operated with the test fuel at a fuel-air ratio causing maximum knock intensity. The engine compression ratio is then adjusted to give a meter reading near midscale. Then two reference fuels are selected such that when they are burned in the same engine at a fuel-air ratio adjusted for maximum knock intensity at the same compression ratio, the reference fuels give meter readings on either side of the test fuel reading. The test fuel rating is then determined from the three readings by linear interpolation. The difference between the reference fuel readings is called the spread.

While the presently used electronic system is an improvement over the mechanical system previously used, it has many deficiencies. For example, its utility is limited to interpolating between two known points. Further, over the range of knock rating of interest, frequent readjustments are required to obtain a specified performance. And these adjustments are made on the basis of the performance of the engine itself. That is, the engine is used to standardize the instrument and any variation between engines or in the same egnine from time to time will cause errors.

Some attempts have been made at improving the presently used instrument. For example, U.S. 3,183,708, issued May 18, 1965, to D. G. Roddick, the present inventor, describes an improved instrument for testing at lower than usual intensities. However, for normal and greater than normal knocking intensities it is inaccurate.

Therefore, it is an object of this invention to provide an improved method and apparatus for measuring the knock intensity of fuels for internal combustion engine.

It is another object of this invention to provide a method and apparatus for accurately measuring intense knocking.

It is another object of the invention to provide a knock meter that may be calibrated independently of the engine.

And finally, it is an object of this invention to provide an electronic knock meter capable of more accurately discriminating between the normal combustion signal and a knocking signal.

SUMMARY OF THE INVENTION

These and other objects of the invention are achieved in a method of indicating knocking in a cylinder of an internal combustion engine that includes generating a first electrical signal with components representing combustion and knocking, where the combustion component includes a negative portion and a positive portion. A second signal equal or proportional to the peak value of the negative portion of the normal combustion component is then generated. The second signal is then subtracted from the positive portion of the first signal to form a third signal. The third signal is clipped to generate a fourth signal proportional to that portion of the first signal greater than the peak value of the combustion component. Finally, the average peak value of the fourth signal is measured. This method may be carried out with the novel instrument comprising a transducer for converting the time rate of change of pressure in an engine cylinder into an electrical signal that includes components representing combustion and knocking where the combustion component includes a positive portion and a negative portion. An amplifier is coupled to the transducer and a filter is coupled to the amplifier. An automatic threshold means is coupled to the filter and a peak detector is coupled to the automatic threshold means. A rectifier is coupled to the peak detector, and an averaging means is coupled to the rectifier. The output of the averaging means is then coupled to a display.

BRIEF DESCRIPTION OF THE DRAWING

Other objects, advantages, and aspects of the invention will become apparent from a further study of the specification and claims with reference to the drawing wherein:

FIGURES 5a-e illustrates the wave form seen at the output of the various component elements in FIGURE 4.

FIGURE 7 is a graph of typical combustion, knock and threshold amplitudes for the research method of measuring octane ratings.

FIGURE 8 is a detailed schematic diagram of one embodiment of the apparatus for carrying out the subject invention as outlined in the block diagram of FIGURE 4.

FIGURE 8a is a detailed diagram of an RC filter network.

FIGURE 8b is a detailed diagram of a second RC filter network.

Referring now to FIGURE 1, there is shown an idealized graph of the combustion in a cylinder of an internal combustion engine. On the vertical scale is time rate of change of pressure in the cylinder, hereinafter referred to as P while the horizontal scale represents time. It will be noted that the curve has a positive portion 10, a peak value 12, a positive peak of pressure point 14, and a negative portion 16 with a negative peak rate of pressure point 17. This curve is essentially the same as the output of a time-rate-of-pressure to voltage transducer positioned in a cylinder if all high-frequency components are filtered out and no knocking is present.

Referring now to FIGURE 2, the normal combustion curve 10 is shown with a peak value of $\dot{P}_{m+}$. A knocking component 18 with a peak value 20 of $\dot{P}_k$ is shown superimposed on normal combustion curve 10. The negative portion of the normal combustion curve has a peak value 17 of $\dot{P}_{m-}$.

In measuring knock intensity, De Boisblanc's instrument attempts to measure the average value of signal in excess of $\dot{P}_{m+}$, that is to measure $\dot{P}_k$. As discussed earlier, De Boisblanc's instrument provides a means for subtracting a fixed voltage from this signal. When in perfect adjustment and under ideal operating conditions, the fixed voltage will correspond to $\dot{P}_{m+}$ and the knock pulse will occur at very nearly the peak value 12 of the normal combustion curve. However, the De Boisblanc's detonation meter is frequently out of adjustment such that the fixed voltage subtracted from the signal no longer corresponds with $\dot{P}_{m+}$ and an error in the knock intensity reading must necessarily result.

Figure 3:
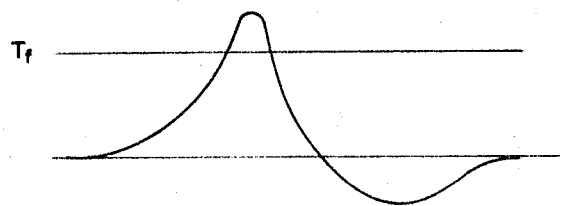
FIGURE 3 is a graph of a normal combustion signal.

A further problem is depicted in FIGURE 3 where a normal combustion curve is shown with a peak value in excess of a fixed voltage threshold $T_f$ but with no knocking present. In this case De Boisblanc's meter indicates strong knocking intensity where in reality none exists. This particular problem is particularly bad in the case of aromatic type fuels that are consequently given a much lower octane rating than they justifiably deserve.

It has been found that this problem can be avoided by continuously varying the threshold voltage in accordance with any change in the value of $P_{m+}$. Accordingly a key feature of the present invention is a method and apparatus utilizing this approach.

Figure 4:
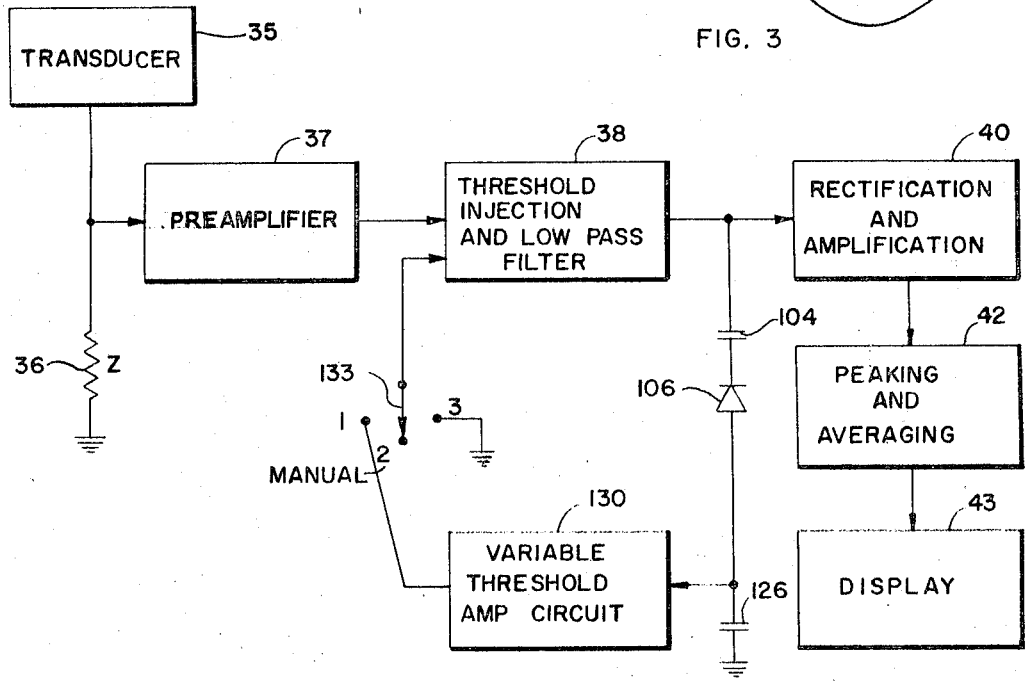
FIGURE 4 is a block diagram depicting one arrangement of components for carrying out the subject invention.

Referring now to FIGURES 4 and 5, the general scheme of the invention will be described. The output of a calibrated piezoelectric transducer 35 is differentiated by a shunting impedance 36. The resulting signal is shown in FIGURE 5a. The transducer output signal is then amplified to a convenient level in preamplifier 37 by an exactly known amount and the high frequency components above about 3000 Hz. are substantially eliminated in this stage. The output signal of the preamplifier stage is shown in FIGURE 5b. In the threshold injection and low pass filter stage, the signal is further filtered so that only frequencies below about 2000 Hz. are left.

To detect the knock pulse, it is necessary to reject that portion of the signal amplitude due to normal combustion rate of pressure rise. This is done by injecting a negative voltage, or threshold voltage, at the threshold injection and low pass filter stage 38. This causes the entire signal to be displaced negatively by exactly the threshold amplitude as indicated in FIGURE 5d. The following rectifier stage 40 clips the signal at 0 voltage which effectively subtracts the threshold voltage from the total signal. If the threshold amplitude is equal to or greater than the normal combustion signal, only the knock pulse is passed by the rectifier stage. This situation is shown in FIGURE 5e. In addition, the rectifier stage can amplify the clipped signal by a selected amount. This allows control of the so-called spread, that is the incremental sensitivity or change in meter reading per change in octane number. In effect then, the rectifier stage subtracts the threshold from the total signal and multiplies the remainder by a preselected amount. A post clipping gain of 2 is shown. This generally affords adequate spread in the practical octane range but higher gains are more satisfactory at times.

Three different threshold sources may be selected via switch 133: 0 volt, a manually set voltage, and an automatically varying threshold voltage.

It has been found that the ratio of the amplitude of the peak rate pressure rise $\dot{P}_{m+}$ to the peak negative rate of pressure drop $\dot{P}_{m-}$, is constant for a given setting of impedance 36 (to be further described later). If $\dot{P}_{m-}$ is detected and amplified by the appropriate factor, the resulting voltage will be equal in magnitude but opposite in polarity to $\dot{P}_{m+}$, the required threshold voltage illustrated in FIGURE 5d. In FIGURE 8, if switch 50 is in position 1, the ratio of $\dot{P}_{m+}$ to $\dot{P}_{m-}$ is substantially 1. If switch 50 is in position 2, the ratio is substantially 2.5. Because there is in practice some instability in the signal, these ratios cannot be exact.

The novel and inventive scheme by which the foregoing step of generating an automatic threshold is accomplished will now be described.

The signal from the output of the filter stage 38 is fed to the cathode of diode 106 via blocking capacitor 104. The negative portion is passed by the diode to charge capacitor 126 to its peak value ($\dot{P}_{m-}$). This voltage is then amplified by the appropriate factor by amplifier 130 to form the threshold voltage signal. When switch 133 is in position 1, the threshold signal is fed back to an input of threshold injection and low pass filter 38.

Figure 1:
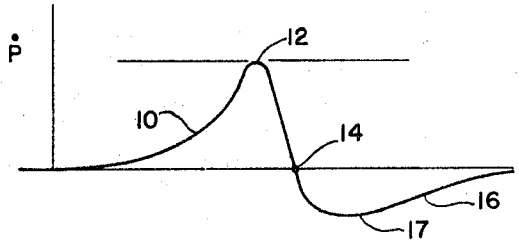
FIGURE 1 is a graph representing the wave form for normal combustion.
Figure 2:
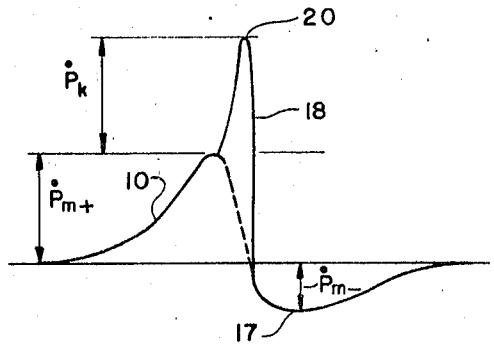
FIGURE 2 is a graph of a wave form representing normal combustion with a detonation pulse superimposed thereon.
Figure 6A:
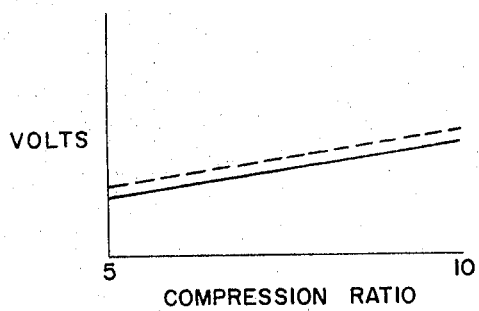
FIGURES 6a-f are graphs of various threshold voltage settings.
Figure 6B:
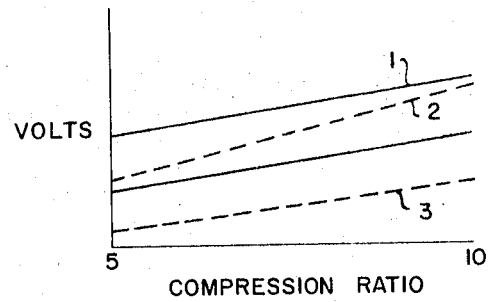

There is also facility for applying a bias voltage to diode 106. This bias may be either a positive or a negative voltage. For the basic threshold, a small negative cathode bias (approximately .32 volt) is required to overcome the forward voltage drop of the diode. The form of this threshold is shown in FIGURE 6a. If negative cathode bias exceeding 0.32 volt is used, the entire threshold is raised, but the slope remains the same as shown in FIGURE 6b, 1. If the cathode bias is decreased as in FIGURE 6b, 3, a low valued threshold is produced. If the gain is increased, a steeper slope is produced as in FIGURE 6b, 2.

Figure 6C:
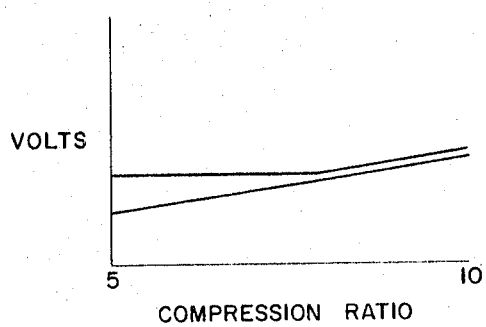
Figure 6D:
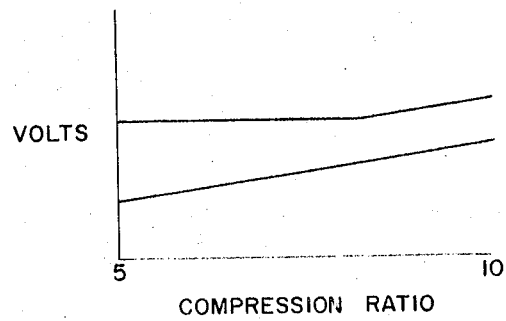
Figure 6E:
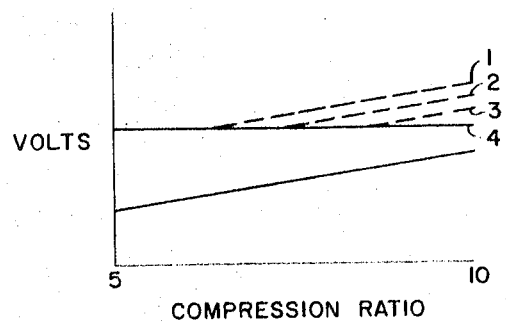
Figure 6F:
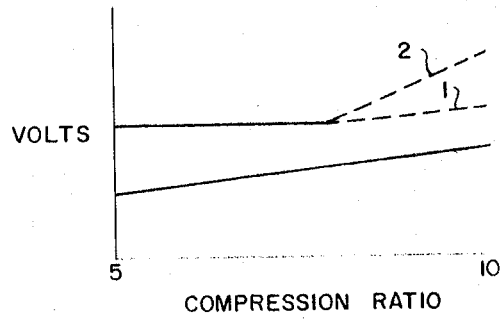

With negative cathode bias equal to the diode drop, and a negative anode bias as well, the threshold of FIGURE 6c is produced. This is a constant voltage threshold up to a certain value of $\dot{P}_{m+}$ and thereafter the same as the threshold in 6a. If the anode bias is increased negatively and the cathode increased negatively at the same rate to maintain a constant difference, the 6c threshold is simply raised as shown in 6d. If on the other hand, the cathode is made less and less negative, the transition point of contact to automatic will shift as shown in 6e, going 1 to 4. If the gain is increased, the slope after the transition increases as shown in FIGURE 6f. In short, by manipulation of two bias controls and a gain control, a wide variety of threshold characteristics may be produced.

For the threshold illustrated in FIGURES 6a and 6b, the actual level at any value of $\dot{P}_{m-}$ voltage is equal algebraically to $(\dot{P}_{m-}+V_d-V_c)G$ where $\dot{P}_{m-}$ is proportional to the peak value of the negative rate of pressure change (a negative voltage),
$V_d$ is the diode forward voltage drop (approximately +0.32 volt),
$V_c$ is the cathode bias, and
G is the gain of amplifier 130.

If negative bias is applied to the anode, the threshold amplitude becomes equal to $V_aG$ ($V_a$=anode bias) up to the point that the magnitude of $(\dot{P}_{m-}+V_d-V_c)$ becomes greater than $V_a$. Then it is equal to $$(\dot{P}_{m-}+V_d-V_c)G$$

as before.

Since all voltage sources and gains are stable and known, any of these thresholds may be set or reproduced at will.

FIGURE 7 shows an analysis of the operation of a research method engine on primary reference fuels with the instrument of the present invention with the transducer shunted for ASTM characteristics. The bottom curve 30 shows the amplitude of the peak value of the rate of pressure rise in absence of knock at the maximum knock fuel-air ratio. The top curve 32 is a plot of the total peak value indicated on the instrument of the present invention of reference fuels defined by ASTM to knock with standard intensity at a given octane number and compression ratio. The numbered dotted lines show the rate of change of $\dot{P}_k$ with compression ratio. Since by ASTM definition standard fuels must read midscale when knocking with standard intensity, the difference between a point on curve 32 and a point on curve 30 corresponding to the same compression ratio should be constant throughout the range of useful octane numbers if continual instrument adjustments are to be avoided. However, a brief examination of FIGURE 7 indicates that such a relationship between curve 30 and 32 does not exist. But with the aid of the bias controls for diode 106, a plot of the instrument threshold, 33, can be made to parallel curve 32. Curve 33 is of the type shown in FIGURE 6c that is constant to a certain level of $P_{m+}$ and thereafter equals $P_{m+}$.

After threshold injection, the signal is as shown in FIGURE 5d. Rectification and amplification stage 40 passes only that portion of the signal above a reference level 49 and amplifies it to some appropriate value for further manipulation. The signal is as shown in FIGURE 5e. Peaking and averaging stage 42 generate a DC signal that is the average peak value of the pulses passed by rectifier 40. Display 43 may be a voltmeter, recorder, or other appropriate device.

DESCRIPTION OF THE PREFERRED EMBODIMENT

The above described general scheme may be implemented in several ways. The following is a detailed description of one way to serve as in example only.

In FIGURE 4, the transducer 35 is a model 601 manufactured by Kistler Instrument Company of Clarence, New York, whose output is characterized by $$Q=KP \qquad (1)$$

where

Q=electrical charge in coulombs,
P=a combustion chamber pressure in p.s.i., and
K=calibration constant of the transducer in coulombs per p.s.i.

If transducer 30 is shunted to ground by an impedance of Z ohms, a current of $i=dQ/dt$ amperes will flow through Z and a voltage $e_0=iz$ will appear at the transducer terminals. In general, Z consists of a resistance R in parallel with a capacitor C that is the sum of the transducer, cable, amplifier, and other stray capacitances. This being the case, the absolute value of Z is $$R/(1+\omega^2R^2C^2)^{1/2} \qquad (2)$$

$$\frac{R}{(1+\omega^2R^2C^2)^{1/2}} \qquad (2)$$

where $\omega$ is equal to $2\pi \times$ the frequency of the signal voltage. From the above expression it is clear that if $\omega^2R^2C^2 \ll 1$, then for all practical purposes $Z=R$.

Differentiating Equation 1 with respect to time, we get $$\frac{dQ}{dt}=K\frac{dP}{dt} \qquad (3)$$

But $dQ/dt$ is the definition of current $i$, and therefore, $$i=K\frac{dP}{dt}$$

By an application of Ohm's law the result is $$e=KR\frac{dP}{dt} \qquad (4)$$

or using the symbol $\dot{P}$ to denote $dP/dt$ we have $$e=K\dot{P}R$$

where $e$ is the transducer output voltage signal. Since for a particular case, K and R are constant, they can be lumped together so that $$e_1=U\dot{P} \qquad (5)$$

volts where $U=KR$ can be considered as the pressure rate constant of the transducer and its shunt impedance. Clearly R may be adjusted in value according to the K value of individual transducers to make U a convenient constant.

Referring now to FIGURE 8, switch 50 allows a choice of two different shunts generally referred to by reference number 36 in FIGURE 4. In position 1, as shown, the transducer is shunted by resistance 52 in parallel with cable and other parasitic capacities plus capacitor 54 which serves to adjust the total input capacitance to a predetermined standard value. In position 1, frequency response of the transducer-shunt system extends to 2000 Hz. (−3 db). In position 2, the transducer is shunted by capacitor 54 in parallel with resistor 51 and the series combination of resistor 53 and capacitor 55. The response is the same as for the pickup in the De Boisblanc meter. Position 3 is an open contact to be used when setting capacitor 54.

The signal from transducer 35 is fed to a preamplifier 56 via input 58. The second input to preamplifier 56 is grounded through variable resistor 62. In the feedback loop of preamplifier 56 are resistor 64 and capacitor 66 in parallel.

The requirements for the preamplifier are high gain-bandwidth product, stability, and a high input impedance (at least several hundred megohms). These requirements may be met by a Nexus SK–2 operational amplifier manufactured by Nexus Research Laboratory of Canton, Mass., connected in a noninverting configuration. The gain of this stage is equal to 1+resistor 64 divided by resistor 62. Resistor 62 is a 10-turn precision potentiometer. Capacitor 66 limits the bandwidth of the preamplifier stage to approximately 3000 Hz. and aids in avoiding saturation by removing some high frequency energy from the signal.

The output of preamplifier 56 is fed through blocking capacitor 68 to an RC filter network 70 depicted in detail in FIGURE 8a. Referring to FIGURE 8a, the RC filter consists of resistor 72 in series with resistor 74 which is in turn in series with resistor 76. The common node between resistors 72 and 74 is connected to terminal 3 through capacitor 78 while the common node between resistor 74 and 76 is connected to terminal 3 through capacitor 80. RC filter 70 can be made to be a pluggable unit as depicted in FIGURE 8, in which case terminals 1, 2 and 3 in FIGURE 8a are connected respectively to terminals 1, 2 and 3 of pluggable RC filter 70. The output of RC filter 70 taken at terminal 2 is supplied to the input 84 of operational amplifier 82. Pluggable RC filter 86 is connected in the feedback loop of operational amplifier 82 between its output 88 and input 84.

Pluggable RC filter 86 is shown in schematic detail in FIGURE 8b. Referring now to FIGURE 8b, terminals 1 and 2 are interconnected by a first series path which includes resistor 89 and capacitor 90. In parallel with resistor 89 and capacitor 90 are resistors 92 and 93. The common node between resistors 92 and 93 is connected through capacitor 94 to lead to terminal 3 which is ultimately connected to the ground. Between terminal 1 and terminal 3 are connected in series capacitor 96 and resistor 98. The common node between capacitor 96 and resistor 98 is connected through capacitor 100 to terminal 2.

The terminals 1, 2 and 3 of FIGURE 8b are adapted to be electrically connected respectively with terminals 1, 2 and 3 of pluggable RC network 86.

Pluggable RC networks 70 and 86, taken in conjunction with amplifier 82, form a third-order Butterworth type active filter and is adjusted for a gain of 1 (inverting) throughout its passband. The RC values in pluggable networks 70 and 86 are so chosen as to produce a cut-off frequency of 2,000 Hz. A Nexus model SK–10 operational amplifier performs well in this stage.

The output of operational amplifier 82 is taken via resistor 102 and capacitor 104 to the cathode of diode 106. The node between capacitor 104 and resistor 102 is connected to ground through capacitor 108 to form a simple low-pass filter for the elimination of high-frequency noise.

The common node between diode 106 and capacitor 104 is connected through resistor 109 to potentiometer 110. One end of the potentiometer 110 is connected through resistor 112 to a negative DC power supply while the other end of potentiometer 110 is connected through resistor 114 to a positive DC power supply. The resistor and power supply values are such that the cathode of diode 106 can be biased from −5 volts to +5 volts.

The anode of diode 106 is connected through resistor 116 to potentiometer 118. One side of potentiometer 118 is connected to ground while the other side is connected through resistor 120 to a negative DC power supply. The resistor and power supply values are such that the diode 106 is connected through an RC π-network consisting of resistor 122 in the series branch and capacitors 124 and 126 in the shunt branches. The common node between capacitors 124 and 126 is grounded. The common node between resistor 122 and capacitor 124 is connected to input 128 of operational amplifier 130. Input 132 of operational amplifier 130 is connected to potentiometer 134, which has one side grounded and the other side connected to terminal 1 of switch 133.

A common terminal of switch 133 is connected through resistor 136 to input 85 of operational amplifier 82. In position 1, switch 133 connects resistor 136 with the output of operational amplifier 130. In position 2, switch 133 connects resistor 136 to potentiometer 138 which has one end grounded and the other end connected through resistor 140 to a negative DC power supply. In position 3, switch 133 connects resistor 136 to ground.

The common node between operational amplifier 82 output, pluggable RC network 86, and resistor 102 is connected through variable resistor 142 to input 144 of operational amplifier 146. Input 148 of operational amplifier 146 is connected through resistor 150 to ground. Connected between the output of operational amplifier 146 and input 144 is a diode 152 with the anode of diode 152 connected to the output of operational amplifier 146. The output of operational amplifier 146 is connected in series through a diode 154, whose cathode is connected to the output of 146, and resistors 156 and 158 to input 166 of operational amplifier 168. The common node between resistors 156 and 158 is connected to ground via capacitor 160. Connected in parallel between the common node of resistors 156 and 158 and input 144 of operational amplifier 146 are capacitor 162 and resistor 164.

Operational amplifier 146 is an inverting amplifier for the positive portion of its input signal. Its gain for the negative portions of its input signal is 0 due to diodes 152 and 154. Its gain is controlled by the ratio of resistor 164 to resistor 142, and since resistor 142 is continuously variable, the gain of operational amplifier 146 may also be varied. Instead of a variable resistor 142 a switch able to select several discrete resistor values has also been found satisfactory. Capacitor 162 determines the band pass of this stage, and its value is chosen such that the bandwidth is in excess of 2,000 Hz. A Nexus model SA–6 or SK–7A can be used for operational amplifier 146.

Capacitor 160 acts as a pulse stretcher and relieves the peak current requirements for operational amplifier 168 which drives the peaking and time constant or averaging networks with an inverting gain of 1.

Input 170 of operational amplifier 168 is connected to ground through resistor 172. The output of operational amplifier 168 is connected through diode 174 to an RC π-network having a variable resistor 178 in its series leg and capacitors 180 and 182 in its shunt legs. The common node between capacitors 180 and 182 is connected to ground. Diode 174 is connected with its anode common with the output of amplifier 168. Connected in parallel between input 166 of operational amplifier 168 and the common node of resistor 178 and capacitor 180 are capacitor 184, resistor 186. Diode 188 is connected between the input of operational amplifier 168 with its anode common to input 166.

The common node between resistor 178 and capacitor 182 is connected to input 190 of operational amplifier 192. The output of operational amplifier 192 is connected with 100% feedback to input 194 of operational amplifier 192. A Nexus model SK–3 works well for operational amplifier 192. The requirements are stability with 100% feedback and very high input impedance to prevent loading of the previous stage.

The output of operational amplifier 192 is taken through switch 193 and variable resistor 194 to the input of one terminal of switch 195. The other input terminals of switch 195 are connected to an internal meter 196. Meter 196 may be a model D–081 manufactured by the General Electric Company, which reads 0–500 DC microamperes.

Switch 193 is capable of selecting any one of terminals 1 through 7. In this way, internal meter 196 may be set by switch 193 to monitor amplifier offsets and various bias voltages. For example, in position 2, meter 196 monitors the voltage selected by switch 133. Other monitor points are illustrated in FIGURE 8.

The output of operational amplifier 192 is also connected through variable resistor 198 to output terminals 200 and 202. Various meters may be connected across these terminals; however, of particular importance, are a Weston meter normally used with the De Boisblanc knock meter and a 10-mv. recorder. Resistor 204 in parallel with output terminals 202 may be used to calibrate the recorder.

OPERATION OF THE INVENTION

Referring to FIGURES 5 and 8, the output of transducer 35 is shown in FIGURE 5a. This signal consists of a normal combustion component of a low frequency with high frequency components and a knock pulse superimposed thereon. This signal is introduced into the electronics of the system at input 58 of operational amplifier 56. Switch 50 determines the value of the shunt impedance as previously described. The gain of amplifier 56 is determined by setting potentiometer 62. The basic function of this stage is to amplify the output signal from transducer 35 to a convenient level while substantially retaining its wave form. It further eliminates high frequency components, and its output is shown in FIGURE 5b.

RC filters 70 and 86 cooperating with amplifier 82 form a low-pass filter stage for eliminating signal frequency components in excess of 2000 Hz. Its output is shown in FIGURE 5c.

The automatic threshold system consists of the components between the output of amplifier 82 and its input 85. Resistor 102 and capacitor 108 provide a simple low pass filter for removing high frequency noise components. Capacitor 104 is a DC blocking capacitor. Diode 106 is disposed so that only the negative portion of the filter signal is passed. Capacitor 126 is charged to the peak value of the signal passed by diode 106. Resistor 122 and capacitor 124 average and smooth this peak value voltage. And finally, the gain of operational amplifier 130 is adjusted to the appropriate value. The output of operational amplifier 130 is therefore equal to $\dot{P}_{m+}$. With switch 133 in position 1, the ouput of amplifier 130 is supplied to input 85 of amplifier 82. This signal is equal in magnitude but of opposite polarity to the peak value $\dot{P}_{m+}$. Amplifier 82 effectively takes the difference between input 84 and input 85. The output of amplifier 82 is shown in FIGURE 5d where it can be seen that the signal is offset from the reference potential 49 by an amount of $\dot{P}_{m+}$.

Operational amplifier 146 in conjunction with diodes 152 and 154 act as a rectifying or clipping stage. That is, it allows only unidirectional positive pulses to pass therethrough. Resistor 142 is made variable so that the gain of this stage can be accurately controlled. The signal is clipped at reference potential, typically ground, to provide an output as shown in FIGURE 5e. Typically the amplification factor will be 2.

FIGURE 5 illustrates only one period of a continuing signal, and it must be understood that normally the signal will be periodic with a wave shape as depicted in FIGURE 5. The output therefore of the clipping stage after inversion will consist of a series of negative going pulses.

Resistor 164 in conjunction with capacitor 160 acts as a pulse stretching network to increase the time dimension of the negative going output pulses of amplifier 146.

Operational amplifier 168 in conjunction with capacitor 184 and resistor 186 perform a peaking function. That is, the time constant of the RC network consisting of capacitor 184 and resistor 186 is such that the capacitor is charged to the peak pulse value and is discharged relatively little before the next pulse is received.

The following RC π-network averages the output of the previous stage to a smooth DC value. This value may then be read out on meter 196 or on a Weston meter normally used with the De Boisblanc meter and/or on a 10 milliampere recorder connected across terminal 202.

While the invention has been particularly shown and described with reference to preferred embodiments thereof, it will be understood by those skilled in the art that various changes in form and detail may be made without departing from the spirit and scope of the invention.

I claim as my invention:

1. A method of indicating knocking in a cylinder of an internal combustion engine comprising:
    generating a first electrical signal proportional to the time rate of change of pressure in said cylinder, said first electrical signal having components representing combustion and knocking, where the combustion component includes a negative portion and a positive portion with respect to a reference level, said negative and positive portions each having a peak value;
    detecting the peak value of said negative portion of said combustion component;
    utilizing said detected peak value to produce a second signal proportional to said detected peak value of said negative portion;
    subtracting said second signal from said first electrical signal to form a third signal, whereby the peak value of said positive portion and said reference level are substantially the same;
    clipping said third signal at said reference level to generate a fourth signal proportional to that portion of the first signal greater than the peak value of the positive portion of said combustion component; and
    measuring the average peak value of said fourth signal.

2. A knock meter for measuring knocking in a cylinder of an internal combustion engine comprising:
    a transducer means for converting the time-rate-of-change of pressure in said engine cylinder into a first electrical signal that includes components representing combustion and knocking where the combustion component includes a positive portion and a negative portion;
    amplifier means coupled to said transducer;
    filter means coupled to said amplifier means, said filter means adapted to remove high frequency components from said first electrical signal;
    threshold means responsive to said negative portion of said combustion component to provide a second signal substantially equal to the peak value of said positive portion of said combustion component;
    subtracting means coupled to said threshold means, said subtracting means adapted to subtract from said filtered signal said second signal substantially equal to the positive peak value of said combustion component;
    rectifying means coupled to said subtracting means;
    peak detecting means coupled to said rectifying means;
    averaging means coupled to said peak detecting means; and,
    display means coupled to said averaging means.

3. An apparatus for indicating knocking within a cylinder of an internal combustion engine comprising:
    transducer means communicating with said cylinder for converting the time rate of change of pressure in said cylinder into an electrical signal that includes components representing combustion and knocking where said combustion component includes a positive portion and a negative portion;
    filter means coupled to said transducer, said filter means having a cutoff frequency between 1500 and 3000 Hz.;
    an automatic threshold means coupled to said filter means, said automatic threshold means comprising a rectifier for passing said negative portion of said combustion component, storage means coupled to said rectifier for storing the peak value of said negative portion of said combustion component;

amplification means coupled to said storage means for amplifying said peak value of said negative portion of said combustion component by a factor of between 2 and 3 to form a threshold voltage that is dynamically self-adjusting to amplitude changes in said combustion component;

means for continuously subtracting said threshold voltage from said positive portion of said combustion component, said means coupled to said automatic threshold means;

rectifier means coupled to said subtracting means, said rectifier means having the facility of passing only the signal component whose amplitude is greater than the amplitude of said positive portion of said combustion component whereby the output of said rectifier means is a sequence of unidirectional pulses;

pulse stretching means coupled to the output of said rectifier means, said pulse stretching means adapted to stretch the time dimension of said unidirectional pulses passed by said rectifier to form a sequence of stretched pulses;

pulse generating means coupled to said pulse stretching means, said pulse generating means adapted to generate a sequence of overlapping pulses with peak values proportional to the peak values of said stretched pulses;

averaging means coupled to said pulse generating means, said averaging means adapted to generate an output whose value is the average of the peak value of said overlapping pulses; and display means coupled to said averaging means.

4. The apparatus of claim 3 wherein said transducer means consists of a quartz crystal pressure transducer having input and output means, said transducer means being capable of receiving a pressure input and generating as output an electrical quantity proportional to said pressure and an electrical impedance connected between said output and a reference potential.

5. The apparatus of claim 4 wherein said filter means includes an operational amplifier having a first and second input and an output, a first RC passive network connected in series with said first input, a second RC passive network connected in a feedback configuration between said output and said first input.

References Cited

UNITED STATES PATENTS

| | | | |
|---|---|---|---|
| 2,633,738 | 4/1953 | De Boisblanc | 73—35 |
| 2,679,746 | 6/1954 | De Boisblanc | 73—35 |

JAMES J. GILL, Primary Examiner

HERBERT GOLDSTEIN, Assistant Examiner